US010956519B2

(12) United States Patent
Davies

(10) Patent No.: US 10,956,519 B2
(45) Date of Patent: Mar. 23, 2021

(54) FINE-GRAINED ENCRYPTED ACCESS TO ENCRYPTED INFORMATION

(71) Applicant: Cisco Technology, Inc., San Jose, CA (US)

(72) Inventor: Thomas Davies, Guildford (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 113 days.

(21) Appl. No.: 15/637,004

(22) Filed: Jun. 29, 2017

(65) Prior Publication Data
US 2019/0005135 A1    Jan. 3, 2019

(51) Int. Cl.
H04L 9/08        (2006.01)
G06F 16/9535     (2019.01)
G06F 21/62       (2013.01)

(52) U.S. Cl.
CPC ...... *G06F 16/9535* (2019.01); *G06F 21/6227* (2013.01); *H04L 9/0894* (2013.01); *G06F 21/6218* (2013.01); *G06F 2221/2107* (2013.01)

(58) Field of Classification Search
CPC ............... G06F 17/30; G06F 17/30592; G06F 17/30174; G06F 17/30073; G06F 17/30067; G06F 17/30563; G06F 17/30153; G06F 21/62; G06F 21/6218; G06F 21/6209; H04L 9/08
USPC ....... 707/600, 637, 667, 693, 705, 759, 770, 707/769; 713/189, 165; 726/27; 715/200
See application file for complete search history.

(56) References Cited

U.S. PATENT DOCUMENTS

| 4,768,192 | A  | * | 8/1988  | Pattavina  | H04J 3/0605 370/466 |
| 7,065,516 | B1 | * | 6/2006  | Bergan     | G09B 7/00 707/687 |
| 7,519,835 | B2 | * | 4/2009  | Koyfman    | G06F 21/6227 713/193 |
| 7,757,278 | B2 | * | 7/2010  | Boneh      | H04L 63/0428 380/255 |
| 7,783,899 | B2 | * | 8/2010  | Golle      | G06F 21/6245 713/193 |
| 8,291,509 | B2 | * | 10/2012 | Kerschbaum | G06F 16/322 726/30 |
| 8,380,720 | B2 | * | 2/2013  | Chang      | G06F 16/313 707/747 |
| 8,527,535 | B2 | * | 9/2013  | Shogaki    | G06F 16/3325 707/769 |

(Continued)

OTHER PUBLICATIONS

Goyal et al., "Attribute-Based Encryption for Fine-Grained Access Control of Encrypted Data", 2006, ACM (Year: 2006).*

*Primary Examiner* — Saleh Najjar
*Assistant Examiner* — Khalid M Almaghayreh
(74) *Attorney, Agent, or Firm* — Polsinelli PC

(57) ABSTRACT

A system, method, and computer-readable media for performing a fine-grained encrypted search of data stored in encrypted form in an encrypted search database. The system includes at least one processor and at least one memory having computer-readable instructions for performing the method. The method includes performing an encrypted search of the encrypted search database based on one or more search terms, presenting a result of the encrypted search on an interface, and performing a further search of an encrypted data storage based on a response to the result.

20 Claims, 4 Drawing Sheets

(56) References Cited

U.S. PATENT DOCUMENTS

| | | | | |
|---|---|---|---|---|
| 8,533,489 | B2* | 9/2013 | Roeder | G06F 16/316 |
| | | | | 713/189 |
| 8,549,653 | B2* | 10/2013 | Kunde | G06F 21/6227 |
| | | | | 713/168 |
| 8,700,653 | B2 | 4/2014 | Hansson | G06F 16/90324 |
| | | | | 707/767 |
| 8,832,427 | B2* | 9/2014 | Roeder | G06F 21/602 |
| | | | | 713/150 |
| 9,152,816 | B2* | 10/2015 | Park | G06F 21/6218 |
| 9,256,762 | B1* | 2/2016 | Roth | H04L 9/3263 |
| 9,256,764 | B2* | 2/2016 | Aissi | G06F 21/606 |
| 9,323,841 | B2* | 4/2016 | Pereira | G06K 9/00718 |
| 9,514,741 | B2* | 12/2016 | Jost | G10L 15/06 |
| 9,544,134 | B2* | 1/2017 | Aissi | G06F 16/22 |
| 9,646,166 | B2* | 5/2017 | Cash | G06F 21/6218 |
| 9,864,805 | B2* | 1/2018 | Annau | G06F 16/24534 |
| 9,971,904 | B2* | 5/2018 | Fan | G06F 21/6227 |
| 2003/0050863 | A1* | 3/2003 | Radwin | G06Q 30/0277 |
| | | | | 705/26.1 |
| 2005/0010563 | A1* | 1/2005 | Gross | G06F 16/951 |
| 2005/0120233 | A1* | 6/2005 | Halcrow | G06F 21/606 |
| | | | | 713/193 |
| 2006/0041533 | A1* | 2/2006 | Koyfman | G06F 21/6227 |
| 2009/0187403 | A1* | 7/2009 | Nomitsu | G06F 21/105 |
| | | | | 704/235 |
| 2010/0303288 | A1* | 12/2010 | Malone | G06F 16/48 |
| | | | | 382/100 |
| 2012/0047134 | A1* | 2/2012 | Hansson | G06Q 30/0275 |
| | | | | 707/731 |
| 2013/0080463 | A1* | 3/2013 | Yamada | G06F 16/2453 |
| | | | | 707/769 |
| 2013/0243186 | A1* | 9/2013 | Poston, Jr. | G06F 21/602 |
| | | | | 380/28 |
| 2013/0262852 | A1* | 10/2013 | Roeder | G06F 21/602 |
| | | | | 713/150 |
| 2014/0052999 | A1* | 2/2014 | Aissi | H04L 9/08 |
| | | | | 713/189 |
| 2014/0164532 | A1* | 6/2014 | Lynch | H04L 12/1818 |
| | | | | 709/206 |
| 2014/0229503 | A1* | 8/2014 | Li | G06F 16/48 |
| | | | | 707/770 |
| 2014/0281589 | A1* | 9/2014 | Bain | G06F 21/6218 |
| | | | | 713/193 |
| 2015/0143112 | A1* | 5/2015 | Yavuz | H04L 9/00 |
| | | | | 713/165 |
| 2015/0356795 | A1* | 12/2015 | Warren | G07C 5/0808 |
| | | | | 701/31.5 |
| 2016/0112190 | A1* | 4/2016 | Aissi | G06F 21/606 |
| | | | | 713/189 |
| 2016/0179908 | A1* | 6/2016 | Johnston | G06F 16/9537 |
| | | | | 707/724 |
| 2016/0232362 | A1 | 8/2016 | Conway | |
| 2016/0283728 | A1 | 9/2016 | Antonopoulos et al. | |
| 2016/0344707 | A1 | 11/2016 | Philipp | |
| 2018/0336244 | A1* | 11/2018 | Barsness | G06F 16/24524 |
| 2019/0129908 | A1* | 5/2019 | Raftery | H04L 61/1511 |
| 2019/0236728 | A1* | 8/2019 | Zhang | G06Q 50/14 |

\* cited by examiner

FINE-GRAINED ENCRYPTED ACCESS TO ENCRYPTED INFORMATION

TECHNICAL FIELD

The present technology pertains to fine-grained encrypted access to encrypted content in order to prevent access to large amount of data, a portion of which may be unrelated to the underlying search and thus avoid unnecessary breach of privacy.

BACKGROUND

The conflict between privacy and law enforcement authorities is well-known and has been extensively debated. However, even when legal access to encrypted data is authorized and decryption is possible, it is very difficult to determine what portion of or how much of the encrypted data to decrypt. As a result, there is a potential for very significant intrusion into privacy of individuals, organizations, etc., because currently authorized legal access can expose significantly higher amount of data and material to decryption and ultimately to law enforcement officials than would be necessary if it were possible to determine the scope of the data at the point of seeking authorization.

Currently, legally authorized access to encrypted data is achieved by the provision of encryption keys to access encrypted data. Access to the data is controlled by technical and legal constraints. The technical constraint on such access is the scope of the key itself. For example, finer-grained access to data can be provided by having a number of keys. This might be routinely done for different security classifications, for example. The second constraint on access is the scope of the legal authorization itself, which is concerned with issues such as which data or communications to grant access to.

There are several drawbacks to this paradigm. The first is that the number of keys for finer-grained access to encrypted data creates management, usability and security problems. Furthermore, a key management system has no concept of the content of the encrypted data itself and/or of the kind of access that might be needed. For example, in a financial context a regulator might want access to conversations between two traders. It is unlikely that a system will provide different access for all possible pairs of traders in the institution, so that only their conversations could be accessed by a key, thus exposing all conversations between all possible pairs of traders to decryption resulting in breach of privacy problem mentioned above.

Another problem with currently utilized methods of accessing encrypted information is that the often large scope of the required access risks law enforcement officials being denied the needed authorization by courts.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
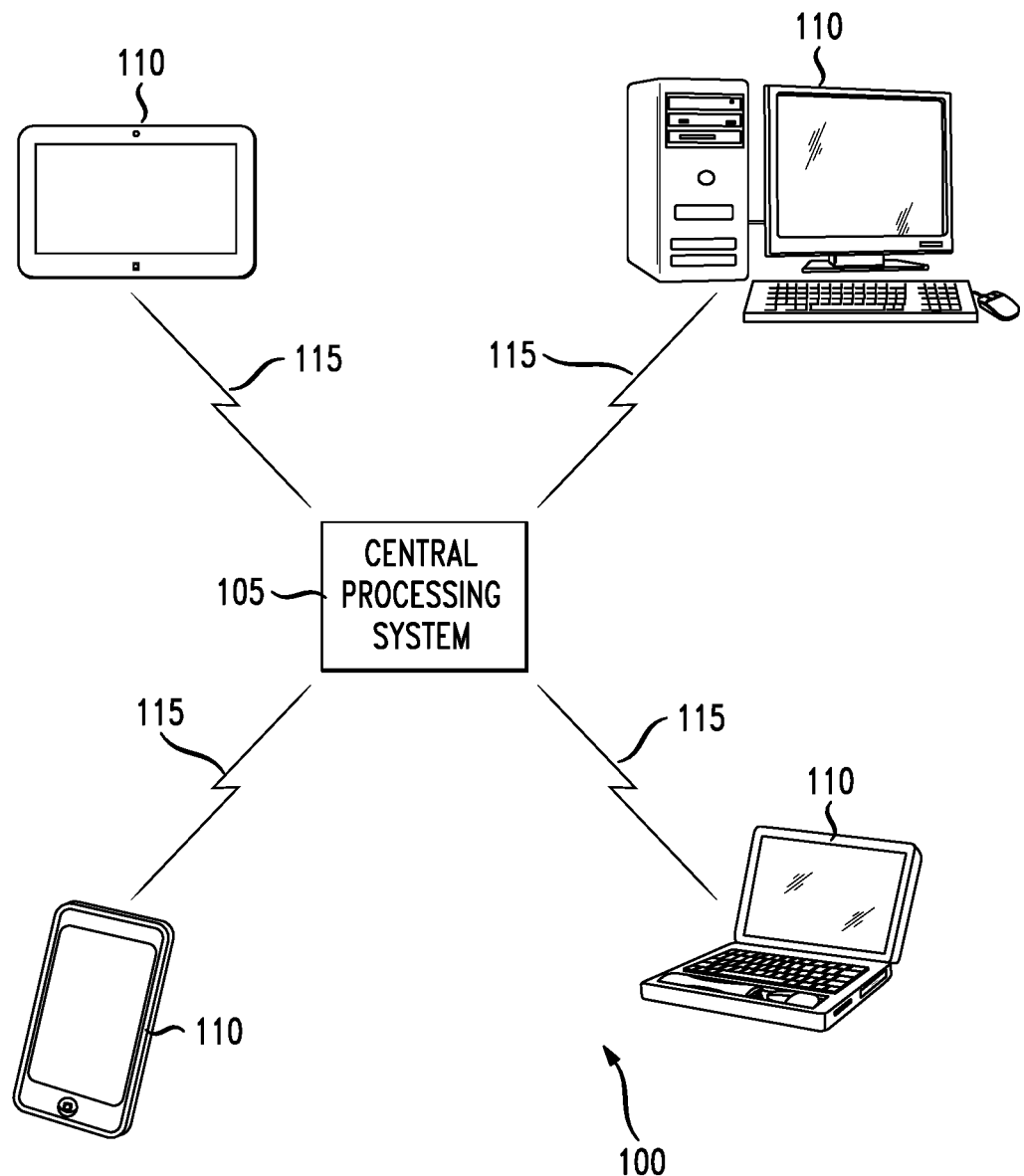
FIG. 1 illustrates a system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

1. Overview

In one aspect, a system includes at least one processor and at least one memory having computer-readable instructions, which when executed by the at least one processor, configure the at least one processor to create an encrypted search database, perform an encrypted search of the encrypted search database based on one or more search terms, present a result of the encrypted search on an interface, and perform a further search of an encrypted data storage based on a response to the result.

In another aspect, a method includes receiving one or more search terms and a request for access to encrypted information stored in an encrypted data storage; performing an encrypted search of an encrypted search database based on the one or more search terms; presenting a result of the encrypted search on an interface; and perform a further search of the encrypted data storage based on a response to the result.

In another aspect, a non-transitory computer-readable medium has computer-readable instructions, which when executed by at least one processor, causes the at least one processor to perform the functions of creating an encrypted search database; creating an encrypted data storage; receiving one or more search terms and a request for access to encrypted information stored in the encrypted data storage; performing an encrypted search of the encrypted search database based on the one or more search terms; presenting a result of the encrypted search on an interface; and perform a further search of the encrypted data storage based on a response to the result.

2. Description

The present disclosure provides methods and systems related to fine-grained encrypted access to encrypted content in order to prevent access to large amount of data, a portion of which may be unrelated to the underlying search and thus avoid unnecessary breach of privacy.

FIG. 1 illustrates a system, according to one aspect of the present disclosure. System 100 is a system utilized in an organization or an institution such a company, a financial institution, a law firm, a governmental organization, etc. However, types of organizations in which system 100 may be utilized are not limited to these examples.

As shown in FIG. 1, system 100 includes a central processing system 105. In general, central processing system 105 can include, among other components, one or more servers, processors, communication means, etc., for managing various communications and equipment used within or in relation to system 100. In one example, central processing system 105 can also monitor and record all communications within system 100 conducted using terminal endpoints associated with system 100. Central processing system 105, as will be described below, can store various forms of all communications in an encrypted manner and/or create an encrypted search database that can be used to perform the fine-grained encrypted search of FIG. 4. Central processing system 105 and components thereof will be further described with reference to FIG. 2.

System 100 further includes a plurality of end terminals 110. Each end terminal 110 can be any one of, but is not limited to, a desktop computer, a mobile device, a tablet, a laptop computer, a desktop telephone, a teleconferencing device, a phone, etc. Each terminal device 110 can be a piece of equipment owned and issued by the organization (that is using system 100) for use by its representative, employee, officers, staff, etc. Each end terminal 110 can have appropriate software and modules installed thereon, providing its corresponding user(s) access to the organizations files, tools, etc. Also through one or more such software, central processing system 105 can monitor and record all or selected incoming and outgoing communications from each end terminal 110, using any know or to be developed monitoring and recording methods.

In another example, end terminal 110 is not owned or issued by the corresponding organization but instead is owned by its user but has appropriate organization software stored thereon, through which central processing system 105 can track, monitor and record all or selected incoming and outgoing communications from such end terminal 110.

FIG. 1 also illustrates that each end terminal 110 can be connected to central processing system 105 through communication lines 115. Communication lines 115 can be any known or to be developed wired and/or wireless communication mean enabling each end terminal 110 to establish a communication with central processing system 105 over the Internet, a private Intranet, etc. In one example, each communication between each end terminal 110 and central processing system 105 is a secure (e.g., encrypted) communication session.

While certain components have been shown as part of system 100, system 100 is not limited thereto. System 100 can have other components and elements that enable a proper functioning thereof (e.g., routers, switches, various interfaces, etc.).

In one example, central processing system 105 can be a virtual central processing system implemented in a cloud environment through services provided by a cloud service provider.

Figure 2:
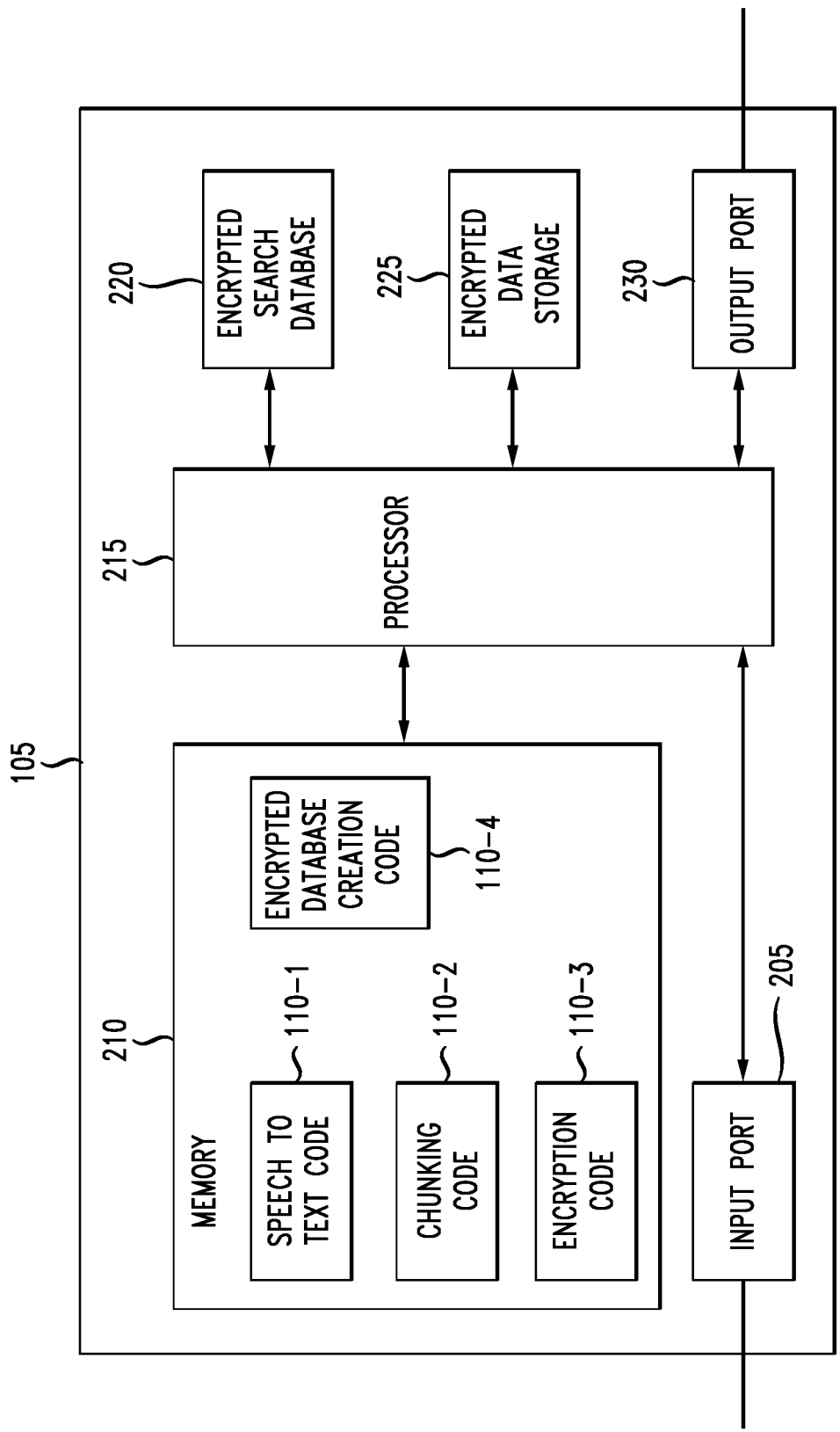
FIG. 2 is a conceptual diagram of components of a central processing system of the system of FIG. 1, according to an aspect of the present disclosure.

FIG. 2 is a conceptual diagram of components of a central processing system of the system of FIG. 1, according to an aspect of the present disclosure. As shown in FIG. 2, central processing system 105 of FIG. 1 includes one or more input ports such as input port 205, one or more memories such as memory 210, one or more processors such as processor 215, one or more encrypted search database such as encrypted search database 220, one or more encrypted data storage such as encrypted data storage 225 and one or more output ports such as output port 230.

In one example, input port 205 can receive various types of data/information (e.g., information and communications of each end terminal 110 to be monitored) from other devices (from one or more end terminals 110) connected thereto.

In one example, in addition to conventional computer-readable instructions for enabling a proper functioning of central computing system 105, memory 210 has one or more software codes (computer-readable instructions) stored therein, which when executed by processor 215, transform processor 215 into a special purpose processor for storing encrypted data, creating encrypted search database and enabling fine-grained encrypted search thereof, as will be described below with reference to FIGS. 3 and 4.

The software codes stored in memory 210 include speech to text code 210-1, chunking code 210-2, encryption code 210-3 and encrypted database creation code 210-4.

In one example, processor 215 may retrieve and execute one or more of the software codes stored in memory 205 to perform any one or more of the functionalities described below with reference to FIGS. 3 and 4.

Encrypted search database 220 is a database of encrypted search terms, the creation of which will be further described below with reference to FIG. 3.

Similarly, encrypted data storage 225 is a storage in which information (communications entering and exiting each end terminal 110) is stored after being encrypted, as will be described below with reference to FIG. 3.

Output port 230 is any known or to be developed port through which processor 215 can transmit appropriate commands (or push appropriate programs, updates, etc.) to one or more of end terminals 110.

Having described an example of several components of central processing system 105, we now turn to discussion of a method according to which an encrypted search database is created for access by an external entity (e.g., a law enforcement entity) upon obtaining appropriate authorizations, warrants, etc.

Figure 3:
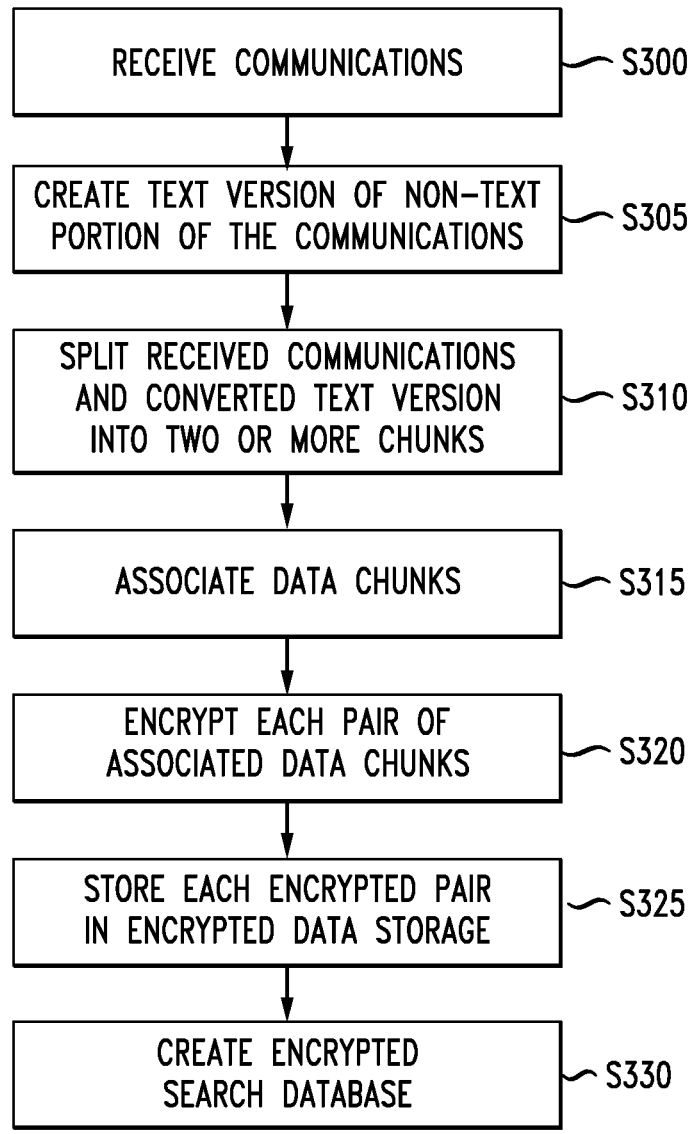
FIG. 3 illustrates a method of creating an encrypted search database, according one aspect of the present disclosure.

FIG. 3 illustrates a method of creating an encrypted search database, according one aspect of the present disclosure. When describing FIG. 3, an assumption is made that two of end terminals 110 are engaged in a communication in which various types of information that are to be encrypted and stored are exchanged. Examples of different types of information include, but is not limited to, audio conversations, video data, documents (e.g., excel sheets, power point presentations, word documents containing written information), etc. Furthermore, FIG. 3 will be described from the perspective of processor 215, when execution appropriate one(s) of software codes (computer-readable instructions) stored in memory 210.

At S300, processor 215 receives communications between two or more end terminals 110 through input port 205.

At S305, processor 215 executes speech to text software code 110-1 available on memory 210 in order to create text version of any non-text based portion of the received communication (e.g., audio data). Speech to text software code implemented by processor 215 may be any known or to be developed computer-implemented codes used to covert speech to text.

At S310, processor 215 executes chunking code 110-2 available on memory 210 to split received communications into two or more data chunks. In one example, processor 215 simultaneously splits the original received communications into two or more data chunks (one or more chunks of data) and splits speech to text converted data at S305 into two or more separate chunks (one or more chunks of text). In other words, processor 215 performs two parallel chunking processes (two independent chunking processes) to create two separate sets of data chunks. In one set, the original communications received at S300 are split into two or more chunks of data and in another set speech to text converted data is split into two or more chunks of text.

In one example, processor 215 includes one or more identifying information in each chunk. Examples of identifying information include but are not limited to, a time stamp, an identification of parties involved in the communications, etc.

At S315, processor 215 associates one data chunk from each of the two separate sets with one another based on the identifying information associated with each data chunk. For example, a data chunk including the first 10 seconds of an audio conversation between two users of two end terminals 110 is associated with a chunk of text that includes a converted text version of the first 10 seconds of the same audio conversation.

At S320, processor 215 executes the encryption software code 110-3 available on memory 210 to encrypt each pair of associated data chunks of S315, which may be referred to an encrypted pair of chunks. Encryption software code 110-3 may be any known or to be developed encryption software available for encryption of any type of data.

At S325, processor 215 stores each pair of encrypted chunks in encrypted data storage 225.

At S330, processor 215 executes encrypted database creation software code 110-4 available on memory 210 to create encrypted search database 220. In one example, processor 215 selects, from each pair of encrypted chunks, the one that includes the encrypted text version of a portion of the communications received at S300 (created at S310) and stores the same in encrypted search database 220. Accordingly, encrypted search database 220 includes encrypted speech to text converted version of different chunks of communications received at S300.

In one example, processor 215 performs the process of FIG. 3 in a continuous manner. In other words, processor 215 is continuously operating and performing the process of FIG. 3 to have all communications encrypted and stored at all times. In another example, processor 215 implements the process of FIG. 3 on a per conversation basis. In other words, processor 215 does not run the process of FIG. 3 at all times but instead initiates the process upon detecting a triggering event. For example, processor 215 initiates the process of FIG. 3 when two or more end terminals 110 establish a communication session.

Having created an encrypted search database 220 and stored an encrypted version of all communication chunks (data chunks) in encrypted data storage 225 according to the process of FIG. 3, we now turn to the discussion of performing a fine-grained encrypted search on data stored in encrypted data storage 225.

As mentioned above, system 100 can represent a financial institution in which central processing system 105 monitors, encrypts and stores all internal/external communications for compliance with regulatory guidelines for example.

At some point in time, such financial instruction may become a subject of an investigation by law enforcement officials (e.g., for an alleged insider trading). Accordingly, law enforcement officials may seek a warrant or authorization to access data stored in the encrypted data storage 225. However, a problem with currently utilized search methods is that because in many instances law enforcement official initially do not have a clear picture of the exact information or content they are looking for, they apply for a relatively broad search warrant (per legal requirements). Such broad search warrant is either denied by officials (courts) or if granted, would expose a large portion of the stored information (which end up being irrelevant to the subject of the investigation) to search by law enforcement officials, thus presenting a case of unnecessary breach of privacy. This is partly due to the fact that stored encrypted data are not stored in the form of two or more chunks.

Figure 4:
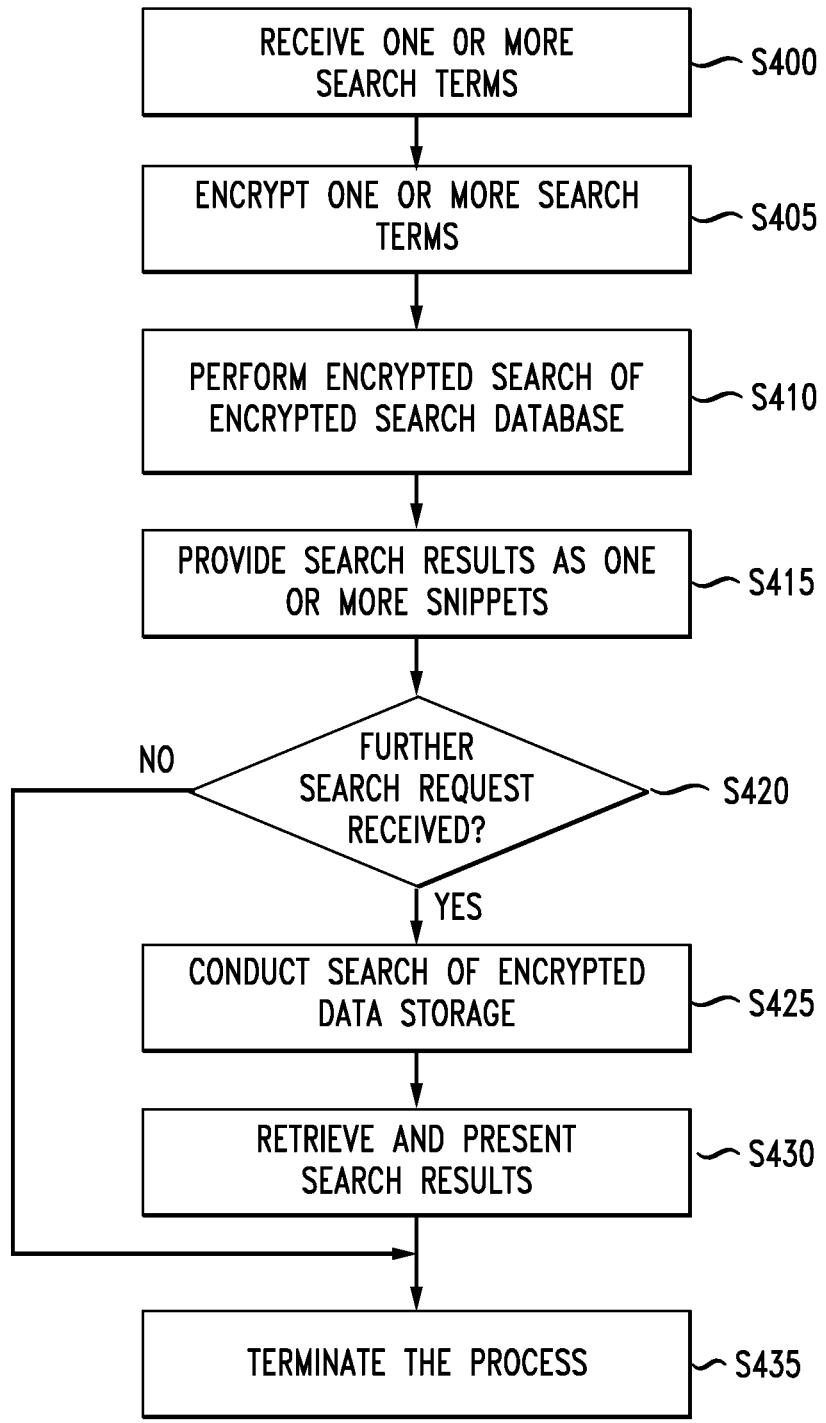
FIG. 4 illustrates a method of fine-grained encrypted search, according to an aspect of the present disclosure.

As a solution to the breach of privacy issue, the present disclosure presents the fine-grained encrypted search method of FIG. 4, according to which an initial encrypted search of the search database 220 is performed (without providing access to all encrypted information in encrypted data storage 225). Depending on the result of the initial encrypted search, law enforcement officials can then seek a follow up search warrant to conduct a more in depth search of relevant portions of encrypted data stored in encrypted data storage 225. This in turn prevents the exposure of unrelated data to law enforcement officials during the search. As will be described below, this fine-grained search method is partly made possible due to the splitting of data into chunks followed by the storage of encrypted versions thereof, per the process described above with reference to FIG. 3.

FIG. 4 illustrates a method of fine-grained encrypted search, according to an aspect of the present disclosure. FIG. 4 is described from the perspective of processor 215. Furthermore, central processing system 105 may be connected to an interface (not shown) through which search request(s) by law enforcement officials are received and thereafter carried out.

At S400, processor 215 receives one or more search terms. The one or more search terms can be search terms provided by law enforcement officials in a requested warrant. In another example, based on the scope of the search described in a requested warrant, one or more search terms may be created and provided as input to processor 215.

At S405, processor 215 encrypts the received one or more search terms. For example, processor 215 can execute encryption software code 110-2 stored in memory 210 to encrypt the one or more search terms.

Thereafter, at S410, processor 215 performs an encrypted search of encrypted search database 220 using the encrypted one or more search terms. In one example, processor 215 performs the encrypted search based on methods described in an article by DX Song et al., "Practical Techniques for Supporting Search of Encrypted Data", published in Proceeding 2000 IEEE Symposium on Security and Privacy. S&P 2000, Pages 44-55, 2000, the entire content of which is incorporated herein in its entirety.

Depending on the result of the search of encrypted search database 220 (e.g., if there is a hit for one of the search terms in the encrypted search database among the chunks of text stored therein), processor 215, at S415, provides one or more snippets (e.g., audio snippets) of the search results. In one example, processor 215 decrypts one or more encrypted chunks of text (or portions thereof) that matched one or more of the search terms, according to any known or to be developed decryption process, and presents the same as the one or more snippets.

For example, processor 215 provides on snippet of an audio segment that has one or more of the search terms included therein. In one example, because the one or more chunks of text stored in encrypted search database 220 are texts, processor 215 can covert the one or more chunks of text back to speech to be played back for law enforcement officials.

Duration of the snippets can vary between a few seconds, to an entirety of one or chunks to an entirety of a call depending on the level of relevance of the search term to the snippet(s).

In one example, the one or more snippets are provided by processor 215 to law enforcement officials at the interface (not shown), through which the one or more search terms were initially received at S400. Thereafter, depending on the relevance of the one or more snippets and the analysis conducted by law enforcement officials, law enforcement officials may determine that access to further relevant information is needed. Accordingly, law enforcement officials can present the audio snippets as part of a new search warrant request to a court. Should the court allow further search, FIG. 4 describes a process according to which encrypted data storage 225 is further searched for more relevant information.

At S420, processor 215 determines if a follow up search request is received via the interface (not shown). If at S420 processor 215 determines that no follow up search request is received, the process proceeds to S435, where the process terminates. In one example and upon presenting the one or more snippets at S415, processor 215 may wait for a period of time in order to receive a follow up search request (e.g., one week, two weeks, etc.). If no follow up search request is received within the period of time, then at S420 processor 215 determines that no follow up search request is received and the method terminates at S435.

However, if at S420, processor 215 determines that a follow up search request has been received (within the period of time), then at S425, processor 215 performs a search of encrypted data storage 225. As mentioned above, the one or more audio snippets returned at S415 are a portion or an entirety of one or more data chunks stored in encrypted search database 220. As also mentioned with reference to FIG. 3, each of these data chunks have an associated chunk together with which they are saved as a pair of encrypted chunks in encrypted data storage 225 and that each of the one or more chunks have one or more identifying information associated and stored therewith.

Therefore, at S425 and using the identifying information associated with data chunks corresponding to the audio snippet(s) returned at S415, processor 215 accesses the other chunk associated therewith (stored as a pair) in encrypted data storage 225, based on the one or more identifying information.

At S430, processor 215 retrieves the associated data chunk and presents the same to a user (a law enforcement official) at the interface (not shown). In one example, the retrieved data chunk(s) are decrypted by processor 215 (using any known or to be developed decryption method/technique) prior to presentation to a user.

In one example, processor 215 not only provides the associated data chunk, but depending on the nature of relevance of data and level of similarity between two or more adjacent chunks of data stored in encrypted data storage 225, processor 215 may also provide one or more adjacent data chunks (that include data included in adjacent chunks created at S310 of FIG. 3) to a user at the interface (not shown).

While presentation of a result on an interface is described in examples above, the present disclosure is not limited thereto. For example, instead of presenting results of searches at S415 and S430, processor 215 may generate a written report including the search results and electronically communicate the same to law enforcement officials through a secure electronic communication means for example.

Similarly, the providing of one or more search terms at S400 and further search requests at S420 do not necessary have to be through an interface physically connected to central processing system 105 but may instead be a remote interface (e.g., a web portal), on which law enforcement officials present credentials and any required search warrants, an upon validation thereof (by central processing system 105, for example) present the one or more search terms and/or further search requests for the encrypted search to be carried out.

As mentioned above, by implementing the processes of FIGS. 3 and 4, the problem of large-scale decryption of data in response to a legally authorized access request and possible breach of privacy issues are addressed.

For clarity of explanation, in some instances the present technology may be presented as including individual functional blocks including functional blocks comprising devices, device components, steps or routines in a method embodied in software, or combinations of hardware and software.

In another example, when generating a 540p based content, processor 114-2 avoids including an overview of conference room 102 in any generated content except, for example, when a participant/speaker enters or leaves conference room 102 (or alternatively generated 540p content to depict a close up view of a participant that enters conference room 102).

In examples described above, an assumption is made that each requesting endpoint device/system has a different streaming resolution associated therewith. However, the present disclosure is not limited thereto and there can be two or more requesting endpoints having the same streaming resolution (e.g., 540p, 1080p, etc.).

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

I claim:

1. A system comprising:
   at least one processor; and
   at least one memory having computer-readable instructions which, when executed by the at least one processor, configure the at least one processor to:
   create an encrypted search database,
   perform an encrypted search of the encrypted search database based on one or more search terms,
   present a portion of a result of the encrypted search on an interface,
   when a response to the result is received within a predetermined period of time, perform a further search of an encrypted data storage based on the portion of the result and present an additional portion of the result of the encrypted search on the interface; and
   when the response to the result is not received within the predetermined period of time, determine not to perform the further search of the encrypted data storage.

2. The system of claim 1, wherein the computer-readable instructions, when executed by the at least one processor, further configures the at least one processor to:
   generate the encrypted search database by:
   converting incoming information to text;
   splitting the text into a plurality of chunks of text;
   encrypting the plurality of chunks of text; and
   storing the plurality of chunks of text.

3. The system of claim 2, wherein the computer-readable instructions, when executed by the at least one processor, further configures the at least one processor to:
   split the incoming information into a plurality of chunks of data;
   encrypt the plurality of chunks of data; and
   store the plurality of chunks of data in the encrypted data storage.

4. The system of claim 3, wherein the computer-readable instructions, when executed by the at least one processor, further configures the at least one processor to:
   store a plurality of pairs of chunks in the encrypted data storage, each of the plurality of pairs of chunks including one of the plurality of chunks of text and one of the plurality of chunks of data.

5. The system of claim 4, wherein each of the plurality of chunks of text and each of the plurality of chunks of data have corresponding identifying information.

6. The system of claim 5, wherein the computer-readable instructions, when executed by the at least one processor, further configures the at least one processor to:
   determine each of the plurality of pairs of chunks based on a matching of corresponding identifying information of one of the plurality of chunks of text and one of the plurality of chunks of data.

7. The system of claim 6,
   wherein,
   the result includes at least a portion of one or more of the plurality of chunks of text stored in the encrypted search database, and
   the further search of the encrypted data storage includes retrieving one or more of the plurality of chunks of data stored in association with the one or more of the plurality of chunks of text as pairs in the encrypted data storage.

8. The system of claim 1, wherein the computer-readable instructions, when executed by the at least one processor, further configures the at least one processor to encrypt each of the one or more search terms to yield encrypted one or more search terms.

9. The system of claim 8, wherein the computer-readable instructions, when executed by the at least one processor, further configures the at least one processor to perform the encrypted search using the encrypted one or more search terms.

10. The system of claim 1, wherein the result includes one or more snippets.

11. The system of claim 10, wherein the one or more snippets are audio snippets having a duration.

12. A method comprising:
    receiving one or more search terms and a request for access to encrypted information stored in an encrypted data storage;
    performing an encrypted search of an encrypted search database based on the one or more search terms;
    presenting a portion of a result of the encrypted search on an interface;
    when a response to the result is received within a predetermined period of time, performing a further search of the encrypted data storage based on the portion of the result and presenting an additional portion of the result of the encrypted search on the interface; and
    when the response to the result is not received within the predetermined period of time, determine not to perform the further search of the encrypted data storage.

13. The method of claim 12, further comprising:
    creating the encrypted search database by:
    converting incoming information to text;
    splitting the text into a plurality of chunks of text;
    encrypting the plurality of chunks of text; and
    storing the plurality of chunks of text.

14. The method of claim 13, further comprising:
    creating the encrypted data storage by:
    splitting the incoming information into a plurality of chunks of data;
    encrypting the plurality of chunks of data; and
    storing the plurality of chunks of data.

15. The method of claim 14, further comprising:
    generating a plurality of pairs of chunks, each of the plurality of pairs of chunks including one of the plurality of chunks of text and one of the plurality of chunks of data; and
    storing the plurality of pairs of chunks in the encrypted data storage.

16. The method of claim 15, wherein the generating the plurality of pairs of chunks is based on a matching of identifying information of one of the plurality of chunks of text and identifying information of one of the plurality of chunks of data.

17. The method of claim 15,
    wherein,
    the result includes at least a portion of one or more of the plurality of chunks of text stored in the encrypted search database, and
    the further search includes retrieving one or more of the plurality of chunks of data stored in association with the one or more of the plurality of chunks of text as pairs of chunks in the encrypted data storage.

18. A non-transitory computer-readable medium having computer-readable instructions which, when executed by at least one processor, cause the at least one processor to:
- create an encrypted search database;
- create an encrypted data storage;
- receive one or more search terms and a request for access to encrypted information stored in the encrypted data storage;
- perform an encrypted search of the encrypted search database based on the one or more search terms;
- present a portion of a result of the encrypted search on an interface;
- when a response to the result is received within a predetermined period of time, perform a further search of the encrypted data storage based on the portion of the result and present an additional portion of the result of the encrypted search on the interface; and
- when the response to the result is not received within the predetermined period of time, determine not to perform the further search of the encrypted data storage.

19. The non-transitory computer-readable medium of claim 18, wherein the computer-readable instructions, when executed by the at least one processor, further causes the at least one processor to:
- create the encrypted search database by:
  - converting incoming information to text,
  - splitting the text into a plurality of chunks of text,
  - encrypting the plurality of chunks of text, and
  - storing the plurality of chunks of text in a database to create the encrypted search database; and
- create the encrypted data storage by:
  - splitting the incoming information into a plurality of chunks of data,
  - encrypting the plurality of chunks of data, and
  - storing the plurality of chunks of data in a storage to create the encrypted data storage.

20. The non-transitory computer-readable medium of claim 19,
wherein,
- the result includes at least a portion of one or more of the plurality of chunks of text stored in the encrypted search database, and
- the further search includes retrieving one or more of the plurality of chunks of data stored in association with the one or more of the plurality of chunks of text as pairs of chunks in the encrypted data storage.

* * * * *